Dec. 13, 1966   M. H. HECHT   3,291,671
DIELECTRIC FUSING OF PLASTIC FILMS
Filed Sept. 4, 1962   2 Sheets-Sheet 1
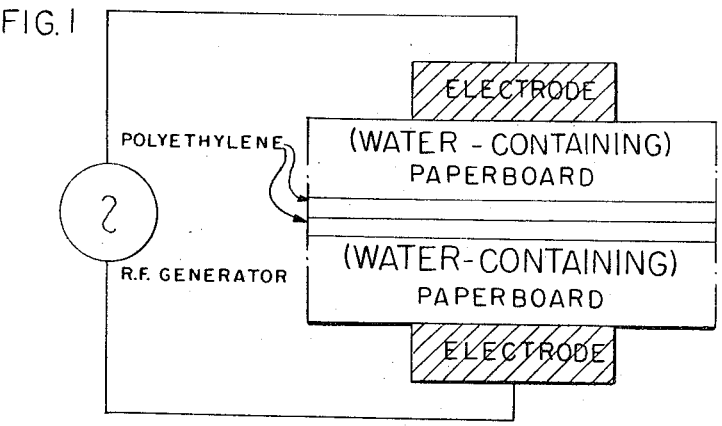
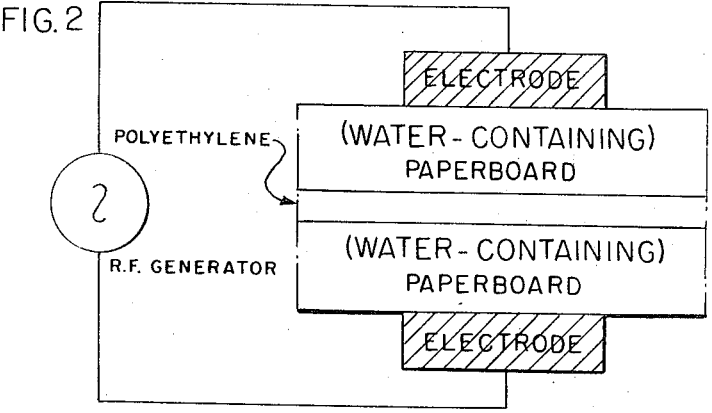
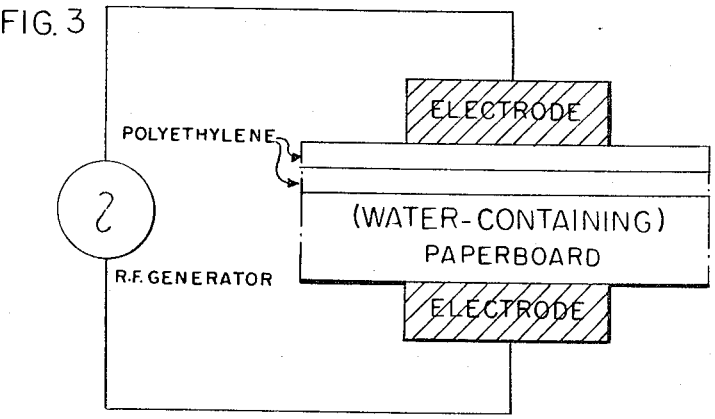
INVENTOR:
MYER H. HECHT
BY
Dawson, Tilton, Fallon, Lungmus & Alexander
ATT'YS

INVENTOR:
MYER H. HECHT

United States Patent Office

3,291,671
Patented Dec. 13, 1966

3,291,671
DIELECTRIC FUSING OF PLASTIC FILMS
Myer H. Hecht, 1429 Central Ave., Deerfield, Ill.
Filed Sept. 4, 1962, Ser. No. 221,670
15 Claims. (Cl. 156—273)

This invention relates to the dielectric fusing of plastic films, and, more particularly, those films which are generally known as non-lossy. The invention also has application to the dielectric sealing and/or dewaxing of waxed surfaces.

This application is a continuation-in-part of my copending application, Serial No. 797,865, filed March 9, 1959, now abandoned.

Further application is had in the dielectric glue sealing of paper, paperboard, corrugated, solid fiber, and other cellulosic materials, singly or in combination. Other applications include the dielectric drying and/or setting of inks, varnishes, coatings, and the like, wherein cellulosic materials are, or form a part of, the substrate.

The invention here contemplates the use of dielectric heating of the direct field type. Apparatus of this nature can be found in Pitman U.S. Patent No. 2,087,480, and this is in contrast to the dielectric apparatus employed for "stray-field" heating, which is found in the Richardson, et al U.S. Patent No. 2,631,642. The latter type of apparatus is employed in conjunction with the method disclosed in my copending application, Serial No. 795,341, filed February 25, 1959, now abandoned.

Illustrative of the non-lossy type of films that can be fused through the teachings of this invention are polyethylene and polypropylene. For a long time, the attempts to fuse polyethylene through dielectric heating have met with indifferent success. It would be desirable to fuse such a non-lossy film dielectrically where, for example, the film were to be employed as a coating for a container, or the like. Alternatively, this would be desirable in uniting together non-lossy films.

However, the advantages of dielectric heating have not been available to those concerned with handling such films, and therefore the laborious expedients of gluing or otherwise adhesively bonding these films have had to be employed. The bonds achieved by gluing or conventional heat-sealing have often been inferior; waste has run high and limitations on speed of production have been a serious handicap in many instances, as has been the limitation on the use to which the structure resulting from the gluing or conventional fusing operation may be put. It is, therefore, an object of this invention to provide a novel method for the handling of non-lossy films such as polyethylene which provides them in a form suitable for bonding.

Another object is to provide a method of uniting a non-lossy film to a surface, either identical in constitution or otherwise, in which direct field dielectric heating is employed. Still another object is to provide a method of the character described in the object immediately preceding in which a dielectrically responsive material such as a water-containing cellulosic material is maintained in the radio frequency field and adjacent the film to be used or bonded. Yet another object is to provide a method for the fusing or bonding of non-lossy films by direct field dielectric heating in which a dielectrically responsive layer, i.e., water-containing layer, is employed for the generation of heat sufficient to bring the film into a condition suitable for fusing, bonding, etc.

A further object is to utilize the natural water content of certain fibrous materials to heat the fibrous material to a degree which will tackify and fuse a dielectric film either directly to the fibrous material or to a second dielectric film. Other objects and advantages of this invention can be seen as this specification proceeds.

The invention will be explained in conjunction with the accompanying drawing, in which—

FIG. 1 illustrates the use of the invention in uniting two layers of paperboard, each being provided with a polyethylene film;

FIG. 2 is a view similar to FIG. 1 but showing a single film of polyethylene interposed between layers of paperboard;

Figure 4:
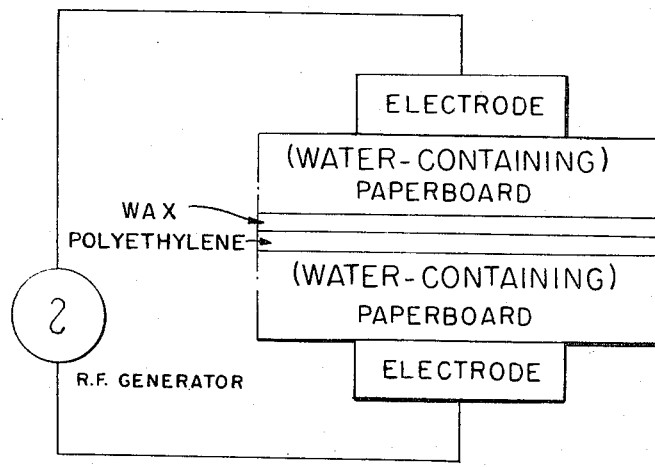
Figure 5:
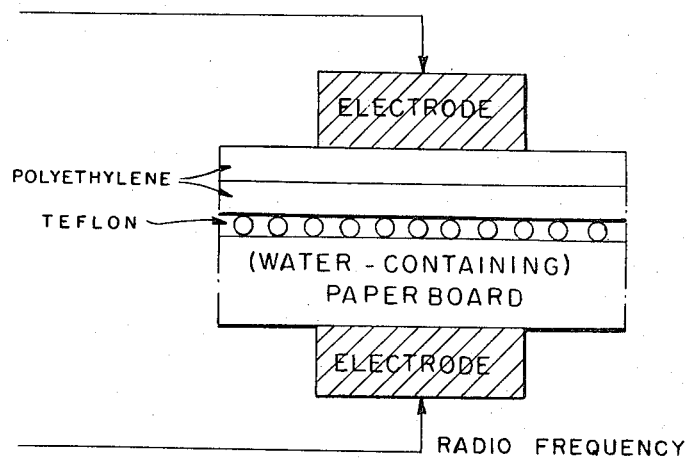

FIG. 3 discloses an arrangement for uniting a polyethylene film to a second polyethylene film previously bonded to paperboard;

FIG. 4 illustrates an arrangement whereby polyethylene may serve to unite a pair of paperboard layers, one of which has been previously coated with wax; and FIG. 5 illustrates the use of the invention in uniting together two polyethylene films by the use of paperboard which is separated from the films by a low dielectric loss factor material with a release-type surface.

In one embodiment of the invention, a non-lossy plastic film is positioned adjacent a water-containing cellulosic layer and thereafter the film and layer are subjected to direct field dielectric heating.

A variety of non-lossy films are amenable, such as polyethylene, polypropylene, blends or copolymers of polyethylene and polypropylene, other polyolefins, including mixtures thereof, polyethylene-, polypropylene- or other plastic-coated polyesters such as "Mylar", heat-sealable polyesters such as "Scotchpak", nylon, "Zytel", "Videne", and the like. These are provided in a form suitable for bonding, either to a film, coating, or lamination of it to itself or to another surface or surfaces. The water-containing cellulosic material may be selected from paper or from various fiberboards or paperboards if stiffness and economy are desired. The fiberboards and paperboards may be either of the cylinder or fourdrinier type, with a caliper of from .007" to about .040", although higher or lower calipers can be suitably employed. Combined fiberboard, in the form or corrugated or solid fiber, may also be employed. Other lignin-free materials such as leather may be used.

The benefits of the invention can be obtained either when the film is directly in contact with the cellulosic layer or when it is separated therefrom by a non-heat-sealable plastic material having dielectric insulating qualities, a smooth or "release-type" surface, and a melting-point substantially above the film. Such an insulating material is Teflon, a polytetra fluoroethylene. Others may be the silicones.

The radio frequency energy providing the dielectric heating is supplied by positioning positive and negative electrodes on opposites of the assembly made up of the film or coating and layer. Normally, frequencies in the megacycle range are employed with power values of about one kilowatt, although higher or lower KW ratings can be used as required. Fusing and/or bonding of the film or coating is achieved with applications of radio frequency energy of the order of less than one second in duration. In certain applications, fiber-tearing bonds have been achieved in one-tenth of a second. Where bonding is desired, the film and layer, or a plurality of films and layers, can be subjected to compression to maintain them in intimate contact. The RF generators that may be satisfactorily employed are those commercially available from J. A. Callanan of Chicago, Illinois, and Erdco, of Addison, Illinois. The voltage and field strength vary with the machines employed and also may be varied according to the thickness of film, thickness, character and water content of the fibrous layer.

Illustrative of the practice of this invention is the following:

Example I

A polyethylene-coated paperboard, the paperboard having a caliper of about .020″, was folded on itself to bring opposite longitudinal edges into overlapping relation preparatory to the formation of a container. The overlapped area of the board was subjected to compression between the electrodes of dielectric heat-sealing apparatus and subjected to 35 megacycle current from a 2 kw. generator for a half second. Upon removal of the assembly from the electrodes, it was found that the overlapped portion was completely integrated, so that a sturdy tube was provided. A rupturing pressure provided a fiber-tearing bond. The same type bond resulted both where the polyethylene was bonded to itself (i.e., face to face), or to the board (i.e., face to back). The foregoing arrangement is generally illustrated in FIG. 2.

Example II

A procedure similar to that set forth in Example I was followed, with the exception that both surfaces of the board were coated with polyethylene. A fiber-tearing bond was achieved in the sealed area. The foregoing is illustrated in FIG. 1.

Example III

A procedure similar to that set forth in Example I was followed, with the exception that one surface of the paperboard was coated with polyethylene, and the other surface with a heavy coating of wax. Like results were obtained in that a fiber-tearing bond was achieved in the sealed area. In this instance, the radio frequency current simultaneously dewaxed the waxed surface and thus presented board fibers for the fused polyethylene to securely latch onto. This arrangement is illustrated in FIG. 4.

Example IV

A procedure similar to that set forth in Example I was followed, with the exception that both the polyethylene surface and the board surface were covered with a heavy coat of wax. Like results were obtained, in that a fiber-tearing bond was achieved in the sealed area. As in Example III, the dielectric heating resulted in a dewaxing of the waxed surfaces, presenting board fibers for the polyethylene to secure itself to.

Example V

The procedure set forth in Example I was followed, utilizing as the material subjected to dielectric heating three layers of polyethylene-coated boards arranged in face-to-face relation to ultimately result in a laminated product. The central layer of paperboard was so arranged relative to the other layers as to be adjacent a polyethylene coating. The lamination provided in this procedure resulted in bonds that ruptured in the fiber, both between the top and central layers and between the center and bottom layers.

Example VI

The dielectric heating procedure set forth in Example I was followed in this Example, using a 1.5 mil film of polyethylene and a .030″ thick boxboard. Prior to the application of dielectric heat, the polyethylene was laminated to the boxboard by a mircocrystalline wax blend. The lamination was folded on itself to bring longitudinal edges of the lamination in overlapping relation prior to subjection to dielectric heating. After the short application of dielectric heat, a bond between the overlapping laminated portions was achieved that ruptured in the fiber rather than in the bond itself. Examination showed that the microwax laminating agent was driven into the board any away from the sealed area.

Example VII

A 1.5 mil film of polyethylene was laminated to a .015″ solid bleached sulfate food-board with Saran (polyvinylidene chloride) resin emulsion adhesive, and the resultant lamination processed as in Example V. As before, fiber-tearing bonds were produced in the sealed area.

Example VIII

A film of polyethylene, 1.5 mil thick, was interspersed between two layers of leather of commercial shoe-manufacturing grade. After being subjected to direct field dielectric heating of the character described in Example I and upon removal of the assembly from the electrodes, it was found that the two pieces of leather had been firmly bonded to each other. The arrangement is similar to FIG. 2 except that the leather is substituted for paperboard.

Example IX

Two films of polyethylene, each 1.5 mils thick, were interspersed between three layers of leather of the character specified in Example VIII to provide an assembly where the layers alternated between leather and polyethylene. Bonds of the character achieved in Example VIII were achieved in this assembly after subjection to dielectric heating of the character specified in Example I.

Example X

A procedure similar to that set forth in Example I was followed, with the exception that "Zytel," a type of nylon, was employed in place of polyethylene. Like results were obtained in that a fiber-tearing bond was achieved in the sealed area when subjected to a rupturing stress.

Example XI

Two films of polyethylene, each 1.5 mils in thickness, were arranged in face-to-face relation. Adjacent each film was positioned a 1.5 mil thickness of Teflon and external to the Teflon was positioned a fiberboard sheet of the character described in Example I. Upon being subjected to direct field dielectric heating of the character described in Example I, it was found that the polyethylene films were firmly united in the area of alignment with the electrodes, and that there was no problem in removing the united films from between the Teflon "release" films. This is seen in FIG. 5.

In each of the foregoing Examples I–X, the plastic film, coating, or lamination was characterized by possessing a sufficiently high viscosity at about its melt or softening point so that it did not run into the board or leather or flow away therefrom, but instead possessed sufficient tackiness and body to latch onto the board or leather fibers. The plastic material thereafter rapidly congealed to maintain the bond thus effected upon removal of the assembly from the dielectric heat source.

It is believed that the superior handling of non-lossy films or coatings in the practice of the invention described in Examples I–X is achieved by virtue of the agitation of the water molecules in the paperboard or leather. The paperboard, for example, which normally contains from 5–8% moisture by weight, when subjected to direct field dielectric heating, has its water molecules agitated so that the fiberboard in the dielectric field is almost instantaneously heated throughout its mass and in turn almost instaneously generates sufficient heat to soften or tackify any heat-activatable material on or near its surface. In this way, direct field dielectric heat in effect converts paperboard from an effective heat insulator to an extremely efficient heat conductor.

The wax coatings or laminating agents in the foregoing examples were each characterized by possessing a sufficiently low viscosity at about its melt or softening point so that it either ran into the board or flowed away from the seal areas when subjected to the direct dielectric field and heated by the process explained above.

The invention also provides a method of rapidly uniting paper, paperboard, corrugated, solid fiber, and other water-containing cellulosic or other materials, singly or in combination, waxed or unwaxed, especially on automatic fabricating the packaging machinery in which direct field dielectric heating is employed, utilizing any one or combination of a number of alternatives:

(a) Blue (vinyl resin emulsion, dextrin, starch, tapioca, animal or vegetable glue, natural or synthetic rubber latex, silicate, urea-formaldehyde, phenol or resorcinal formaldehyde, etc.)
(b) A heat sensitive plastic or resinous film, coating or lamination.
(c) A wax blend.

Benefits here include one or more of the following:

(1) Faster sealing operations.
(2) The elimination of sealing difficulties and waste caused by irregularities or variations in surface and in material density, porosity, thickness, composition, etc.
(3) Obviating special dewaxing equipment.
(4) The enhancement of the sealing power of adhesives and the enlargement of their scope, thereby
(5) Enabling a factory to standardize on a minimum of adhesives for a wide variety of surfaces.
(6) The covering up of exposed board fibers.
(7) The elimination of the wax dipping operation of milk cartons in dairies; obviating the need to ship set-up milk cartons; eliminating the flake-off of wax from the carton into the milk.

Also illustrative of the invention are the following examples which have special application where the above-mentioned advantages are desired:

Example XII

A procedure similar to that set forth in Example I was followed, with exception that a butadienestyrene copolymer coating was employed in place of polyethylene, with like results being obtained with the copolymer arranged face-to-face or face-to-back, when the assembly was subjected to a rupturing stress.

Example XIII

A 1 mil (100 gauge) polyvinylidene chloride (Saran) film was laminated to .016" boxboard with a microcrystalline wax blend. When a procedure similar to that set forth in Example I was followed, a laminate was obtained that ruptured in the fiber rather than the bond when subjected to rupturing stress.

As before, the direct RF field simultaneously dewaxed the waxed board surface, presenting board fibers for the fused Saran to securely latch onto.

Example XIV

A procedure similar to that set forth in Example VIII was followed, with the exception that a film of polyvinyl chloride, 1 mil thick, was employed in place of the polyethylene. Like results were obtained respectively, in that the leather assembly was securely cemented.

Example XV

A procedure similar to that set forth in Example IV was followed, with the exception that a heavily waxed paperboard, such as is commonly used in the fabrication of seal-end style cartons for packaging butter, ice cream, lard, frozen vegetables, pot pies, TV dinners, milk, and the like, was employed, and with the additional exception that a commercial vinyl resin emulsion adhesive was spread over one waxed surface before it was folded on itself. When the assembly was removed from the electrodes, a fiber-tearing bond was observed when the assembly was subjected to a rupturing stress. As in Example IV, the board surfaces were simultaneously dewaxed and bonded, this time, however, by means of the dielectric simultaneously driving the water out of the glue line and setting the adhesive now securely latched onto board fibers.

Example XVI

A procedure similar to that set forth in Example XV was followed with the two following exceptions:

(1) a blend of ethyl cellulose, microcrystalline wax, and paraffin wax was employed, the blend having a substantially high viscosity at about its melt or softening point.
(2) no adhesive was interposed between the surfaces.

Fiber-tearing bonds were produced. Here, the wax blend having a substantially high viscosity and tack, instead of substantially disappearing from the board surface on fusion, serves, as did the polyethylene and the other plastic films previously cited, as its own adhesive.

Example XVII

A procedure similar to that set forth in Example XV was followed, with the exception that the paperboard was not waxed. A commercial vinyl resin emulsion adhesive was spread over the appropriate paperboard surfaces before the paperboard was folded over on itself and surfaces mated. When the assembly was removed from the electrodes and subjected to a rupturing stress, a fiber-tearing bond was observed in the seal area.

Example XVIII

A procedure similar to that set forth in Example XVII was followed, with the exception that a commercial dextrin adhesive was used instead of the vinyl resin emulsion. Similar results were obtained.

Practitioners of the art will realize that the procedure is not limited to the types of adhesive cited, but that a wide range of adhesives are operative, depending upon the surfaces to be glued and the end properties desired of the bonded assembly.

Example XIX

A strip of polyethylene-coated Mylar was placed in contact with a 2 mil polyethylene-coated kraft paper which had been laminated to .024" solid bleached sulfate paperboard, the two polyethylene surfaces facing each other. After compression between the electrodes of dielectric heat-sealing apparatus and subjected to 35 megacycle current from a 2 kw. generator at a power output of ½ kw. for ½ second, and upon removal of the assembly from the electrodes, the polyethylene-coated Mylar was welded to the polyethylene-coated kraft paperboard with a fiber-tearing bond. The general arrangement is seen in FIG. 3.

Example XX

A 1.5 mils film of "Videne," a polyester, was heat laminated to .022" solid bleached sulfate board, and a procedure similar to that set formth in Example I followed. Like results were obtained in that a fiber-tearing bond was achieved in the seal area when subjected to a rupturing stress. When an assembly was prepared similar to that described in Example V, analogous results were obtained to those achieved in Example V.

Example XXI

Two films of 1 mil polyethylene-coated cellophane were arranged in face-to-face relation, polyethylene-to-polyethylene. Upon being subjected to direct field dielectric heating of the character described in Example I, it was found that the films were firmly united in the area of alignment with the electrodes.

Example XXII

A two and one-half mil film of Scotchpak, a polyester film treated on two sides to render them heat-sealable, was heat laminated to a sulfite paper and so folded as to create a double-gusseted bag of the type tube. An assembly simulating the bottom seal area of a bag was then subjected to direct RF dielectric heat of the character set forth in Example I. Fiber-tearing bonds were achieved in all areas where the Scotchpak was in contact with itself or the paper.

The invention also facilitates and speeds up the drying and/or hardening of film-forming materials, such as inks, especially printing inks, varnishes, lacquers, coatings, and the like, previously deposited on and/or in a dielectrically responsive substrate, and/or on and/or in a dielectrically non-responsive substrate but with a dielectrically responsive material or materials in the electrostatic field.

In this instance, the dielectrically responsive material, which can be a water-containing cellulosic substance, e.g., paper paperboard, corrugated, solid fiber, and the like, singly or in combination, is rapidly heated by the radio frequency current, and almost instantaneously transmits its heat or a portion thereof to:
(a) drive off solvent; and/or
(b) catalyze or convert or accelerate the conversion of the film-forming material to a set, dried, or substantially tack-free condition, suitable for shipping or for subsequent operations in the converting plant.

While, in the foregoing specification, I have set forth a detailed description of embodiments of the invention for purposes of explanation, it will be apparent to those skilled in the art that many variations in the details thereof may be made without departing from the spirit and scope of the invention.

I claim:
1. In a method of uniting opposed confronting surfaces of layers of paperboard containing by weight approximately 5–8% water distributed throughout the mass of said paperboard, the steps of:
   interposing between and in direct face-to-face contact with the opposed confronting surfaces of sad water-containing paperboard layers at least one electrically non-polar, low dielectric loss factor thermoplastic film not inherently capable of being fused by a direct radio frequency field impressed across it,
   positioning said paperboard layers with said low dielectric loss factor thermoplastic film in intimate contact therebetween under pressure between electrodes in a direct radio frequency field in the megacycle range, and
   maintaining said field until said plastic film is tackified and fused to the opposed surfaces of said paperboard layers.
2. The method of claim 1 in which the dielectric loss factor of the plastic film is no more than 0.03 at $10^6$ cycles per second.
3. The method of claim 1 in which the dielectric loss factor of the plastic film is less than 0.01 at $10^6$ cycles per second.
4. The method of claim 1 in which the dielectric loss factor of the plastic film is less than 0.001 at $10^6$ cycles per second.
5. The method of claim 1 wherein said thermoplastic film comprises a polyolefin selected from the group consisting of polyethylene and polypropylene.
6. The method of claim 1 wherein said thermoplastic film is initially coated directly onto at least one of said opposed confronting surfaces.
7. The method of claim 1 wherein said thermoplastic film is initially coated onto one of said opposed confronting surfaces, and wax is initially coated onto the other of said opposed confronting surfaces.
8. The method of claim 1 in which the frequency between the electrodes is of the order of 35 megacycles per second.
9. The method of claim 1 in which the frequency between the electrodes is less than 100 megacycles per second.
10. In a method of uniting opposed confronting surfaces of layers of fibrous material selected from the group consisting of paper and leather and containing by weight approximately 5–8% water distributed throughout the mass of said fibrous material, the steps of:
    interposing between and in direct face-to-face contact with the opposed confronting surfaces of said water containing fibrous layers at least one heat-softenable, electrically non-polar, low dielectric loss factor plastic film, said film not rendered tack when by itself under pressure betwen electrodes in a direct radio frequency field in the magecycle range,
    positioning said layers with said low dielectric loss factor plastic film in intimate contact therebetween under pressure between electrodes connected to a radio frequency generator,
    applying direct field radio frequency current in the magacycle range, and
    maintaining said current until said film is tackified and fused to the opposed confronting surfaces of said fibrous layers, said film becoming tacky at a temperature attained by the fibrous layers, utilizing substantially only the heat resulting from the increased agitation of the molecules of said water in said fibrous layers due to the imposition of said radio frequency current.
11. In a method of uniting low dielectric loss factor; electrically non-polar thermoplastic films not capable of being fused when by themselves in a direct radio frequency field in the megacycle range, at least one of which has previously been bonded to a layer of paper-board containing approximately 5–8% water by weight distributed throughout the mass of the paperboard, the steps of:
    positioning said paperboard with said film in direct face-to-face contact under pressure between electrodes of a radio frequency generator,
    applying direct field high frequency current in the megacycle range to said electrodes to tackify said thermoplastic films,
    and maintaining said current until said films are fused, said films becoming tacky at the temperature the fibrous layer attains essentially only from the heat generated within it by the said water therein.
12. In a method of uniting low dielectric loss factor thermoplastic films infusible when alone in a direct high frequency field in the megacycle range, the steps of:
    positioning said films in direct face-to-face contact,
    superposing over and in direct face-to-face contact with at least one of said films a layer of a low dielectric loss factor material having a release-type surface and a fusing point substantially above that of said films,
    superposing over and in direct face-to-face contact with said release material a layer of paper-board containing by weight approximately 5–8% water distributed throughout the mass of the paperboard, and
    subjecting said films, said superposed release material, and said superposed paperboard under pressure between electrodes of a high frequency generator to high frequency current in the magacycle range, said electrodes being arranged in direct field relation, to tackify and fuse said films, said films becoming tacky at a temperature attainable by utilizing substantially only the heat resulting from the agitation of the molecules of said water in said paperboard.
13. In the method of uniting paper layers containing about 5–8% water by weight distributed throughout the mass of said paper layers, at least one of said layers being coated with polyethylene, the steps of:
    positioning said paperlayers with the polyethylene therebetween in direct face-to-face contact under pressure between the electrodes of a radio frequency generator, said electrodes being arranged in direct field relationship, applying high frequency current in the megacycle range to the electrodes to heat said water, and utilizing essentially only the heat generated within the paper layers as a result of the heating of the water therebetween to tackify and fuse the polyethylene to said paper layers.

14. The method of claim 13 in which the frequency between the electrodes is less than 100 megacycles.

15. The method of claim 13 in which the frequency between the electrodes is 35 megacycles.

References Cited by the Examiner

UNITED STATES PATENTS

| | | | |
|---|---|---|---|
| 2,407,833 | 9/1946 | Jablonsky | 156—273 |
| 2,631,642 | 3/1953 | Richardson et al. | 156—69 |
| 2,667,437 | 1/1954 | Zoubek | 156—273 |
| 2,992,958 | 7/1961 | Yamaguchi | 156—307 |
| 3,113,899 | 12/1963 | Hoag et al. | 156—273 |

EARL B. BERGERT, *Primary Examiner.*

D. J. DRUMMOND, *Examiner.*